United States Patent [19]

Greiner

[11] Patent Number: 4,621,661

[45] Date of Patent: Nov. 11, 1986

[54] METHOD AND APPARATUS FOR STIFFENING SECTIONS AND A MECHANICAL JOINT FOR USE THEREWITH

[75] Inventor: Waldemar H. Greiner, Hamilton, Canada

[73] Assignee: Ductlok, Inc., Hamilton, Canada

[21] Appl. No.: 697,519

[22] Filed: Feb. 1, 1985

[51] Int. Cl.⁴ ............................................. B23P 19/02
[52] U.S. Cl. ..................................... 138/172; 29/251; 29/432
[58] Field of Search ............... 138/103, 107, 172, 177, 138/162, 153, 155, 158, 163, DIG. 4; 285/424; 29/521, 428, 432; 428/940

[56] References Cited

U.S. PATENT DOCUMENTS

| | | | |
|---|---|---|---|
| 641,580 | 1/1900 | Cummins | 138/DIG. 4 |
| 760,216 | 5/1904 | Laws | 138/DIG. 4 |
| 1,791,255 | 2/1931 | Wagner | 138/DIG. 4 |
| 1,935,690 | 11/1933 | Zack | 138/DIG. 4 |
| 2,275,572 | 3/1942 | Somers | 285/424 |
| 2,491,700 | 12/1949 | Zwerling | 285/424 |
| 3,202,184 | 8/1965 | Godshalk | 138/172 |
| 3,729,804 | 5/1973 | Middleton | 29/521 |
| 4,046,409 | 9/1977 | Virgin | 285/424 |
| 4,252,350 | 2/1981 | Smitka | 285/424 |

FOREIGN PATENT DOCUMENTS 21955  2/1979  Japan ................................. 29/521

OTHER PUBLICATIONS

"A New Mechanical Joining Technique", Sawhill et al., (SAE Technical Paper Series 830128, ISSN 0148-7191), Published 2-28-83.

Primary Examiner—Stephen Marcus
Assistant Examiner—Leo Peters
Attorney, Agent, or Firm—Sim & McBurney

[57] ABSTRACT

A mechanical connection for connecting together a juxtaposed first and second layer of malleable sheet material includes the use of a third layer of malleable sheet material overlying the first and second layers, with the second layer sandwiched between the first and third layers. The first layer has a first displaced pocket projecting away from the second layer, and the second layer has a second displaced pocket nesting within the first displaced pocket. The third layer has an aperture in registry with both pockets, the aperture resulting from the punching out of a disc or slug which is nested within the second displaced pocket. In a preferred embodiment, a length of duct with at least one flat wall has an intermediate lateral stiffener which includes a base leg defined by two juxtaposed layers of sheet metal, the base leg being connected with the flat wall against which it is juxtaposed by the mechanical connection described above.

7 Claims, 3 Drawing Figures

METHOD AND APPARATUS FOR STIFFENING SECTIONS AND A MECHANICAL JOINT FOR USE THEREWITH

This invention relates generally to a mechanical joint for connecting together a juxtaposed first and second layer of malleable sheet material, such as sheet metal, and has to do particularly with the use of such mechanical joint in strengthening ductwork.

BACKGROUND OF THIS INVENTION

Generally, sections of rectangular ducts are connected by transverse joints, one of which uses the recently developed slip-on type of rollformed flange.

In the North American sheet metal industry, a regulatory body called "Sheet Metal and Air Conditioning Contractors National Association, Inc." (SMACNA) publishes construction standards for round and rectangular ductwork. The standards in rectangular ducts require that all ducts be constructed within the following limitations:
(i) Maximum transverse joint or transverse reinforcement deflection must not exceed 0.250";
(ii) Maximum combined joint and centre sheet deflection must not exceed 0.750";
(iii) The maximum allowable design stress is 24,000 psi.

In order for SMACNA to accommodate limitations of most fabricating shops and to incorporate the limitations set out in the construction codes, it was necessary for SMACNA to prepare suggested construction alternatives as a guide for the sheet metal contractor.

As an example, consider a pressure of 4" W.G. (inches of water gauge: 1" W.G.=0.0361 psi), and a duct ranging in width from 37" to 42". For this situation there are five alternative constructions:
(i) F class joint or reinforcement can be spaced a maximum of 5 ft using 16 gauge duct material. (The classes of joints or reinforcements have different stiffnesses).
(ii) F class @5 ft using 18 ga.
(iii) F class @4 ft using 20 ga.
(iv) E class @3 ft using 22 ga.
(v) E class @2½ ft using 24 ga.

Most contractors operate with either a 4 ft or 5 ft line. This means that their most cost-effective joint spacing would be 4 ft or 5 ft, depending on the size of line they have. The size of line reflects the width of sheet or coil which is used.

Consider a contractor who stocks 4 ft material, either 4×8 ft sheets or 48" coils. If this contractor is required to construct 3 ft joint spacings, he will have considerable scrap losses. Ideally, the contractor wishes to construct his duct from one joint spacing.

In order to maintain his spacing and still satisfy the SMACNA construction requirements, he must change gauges. Most contractors store 4 or 5 gauges in the shop to cover the majority of the work. This means that the contractor is buying smaller quantities per gauge, and usually paying a premium. He buys either from a service centre or from the steel mills directly. In either case, small quantity purchases usually mean paying a premium for the sheet metal.

Furthermore, if a contractor with a 4 foot line had a choice of constructing a duct from 20 gauge joint spaced at 4 ft or a duct from 24 gauge joint spaced at 4 ft plus an intermediate reinforcement at 2 ft, he usually would build the most economical one, which is the heavier gauge material. This follows because of the very high labour rates and the amount of material and labour involved in building the intermediate reinforcement. For this reason, it is usually cheaper to install the heavier gauge alternative without the reinforcement at 2 ft spacing.

GENERAL DESCRIPTION OF THIS INVENTION

In view of the foregoing, it would be of advantage to provide an intermediate stiffenener which does not require the considerable labour that is now necessitated, thus permitting a contractor to use the thinner gauge material along with the cheaper stiffener.

This invention, in addition to acoomplishing the foregoing aim, also allows the standardization of gauge in a shop. Further, the fastening of the stiffener onto ductwork is done externally in a leakproof manner, which makes the stiffener an integral part of the ductwork. No bolting is required, nor is it necessary to completely envelop the duct, as is currently the standard practice for high pressure ductwork.

More particularly, this invention provides a mechanical connection for connecting together a juxtaposed first and second layer of malleable sheet material, the connection comprising:
a third layer of malleable sheet material overlying the first and second layers, with the second layer sandwiched between the first and third layers,
the first layer defining a first displaced pocket projecting away from the second layer,
the second layer defining a second displaced pocket nested within said first displaced pocket,
the third layer having an aperture in registry with both pockets, the aperture resulting from the punching out of
a disc which is nested within the second displaced pocket.

Further, this invention provides a length of duct constructed from sheet metal and having at least one substantially flat wall and an elongated stiffener on said flat wall intermediate the ends of the length of duct, the stiffener being made from formed sheet metal and comprising, in section:
(a) a base leg defined by two juxtaposed layers of sheet metal, and
(b) an upstanding leg defined by at least one layer of sheet metal,
(c) all said layers being integral with each other,
the stiffener being juxtaposed with its base leg against said flat wall so that there are defined first, second and third layers of juxtaposed sheet metal, the second layers being sandwiched between the first and third layers,
the stiffener being joined to the said flat wall by a plurality of mechanical connections, at each connection:
(d) the first layer defining a first displaced pocket projecting away from the second layer, the first pocket having integral bottom and side walls,
(e) the second layer defining a second displaced pocket nested within said first displaced pocket, the second pocket having integral bottom and side walls,
(f) the third layer having an aperture in registry with both pockets, the aperture resulting from the punching out of
(g) a disc which is nested within the second displaced pocket.

Because the construction to be described herein is applied by a piece of machinery, most of the labour is taken out of the application. The greatest cost factor is the material alone. With the present invention, it becomes cost-effective to construct all duct joints from the largest practical joint spacing (5 ft) and the minimum gauge. The use of more than one stiffener per duct section would allow as much as four reductions in gauge. For example, 4" W.G. 60" wide duct made from 16 ga joint spaced at 5 ft can now be constructed from 24 ga joint spacing at 5 ft, using two stiffeners as set forth herein.

Because the stiffener is fastened by a means that makes it the equivalent of an integral part of the ductwork, the stiffener cannot separate from the duct, even at high pressure conditions. Under conventional practice, the gauge of the duct sheet metal and the type of screw used dictate whether the stiffener requires to be enveloped around the duct. The present method of fastening is a means of allowing stiffening without requiring the complete envelope. This represents a further saving of both labour and material.

In its broadest aspect, the present invention relates to the mechanical connection itself, which utilizes a punch technique for connecting a first and second juxtaposed layer of malleable sheet material together, by using a third layer of malleable sheet material as a "sacrifice" layer providing a punched-out slug which helps to lock the first two layers together. It is already known to utilize a punch technique to provide mechanical joining or connection of two juxtaposed layers, and reference in this regard may be had to a paper entitled "A New Mechanical Joining Technique for Steel Compared with Spot Welding", by J. M. Sawhill, Jr. and S. E. Sawdon (SAE Technical Paper Series 830128, ISSN 0148-7191). However, applicants have found that the shearing and vertical holding strengths of a connection between two juxtaposed layers of malleable sheet material can be increased over the standard punch technique by at least 100% using the third sacrificial layer to provide a slug, to the point where the mechanical connection provided herein is as effective as a good spot weld. The top or sacrificial layer is not itself fastened to the two bottom layers. In the intermediate stiffener construction for a duct wall, the specific application of this technique provided herein, the top layer does not need to be connected to the two bottom layers, since the top layer is already an integral part of the second layer.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
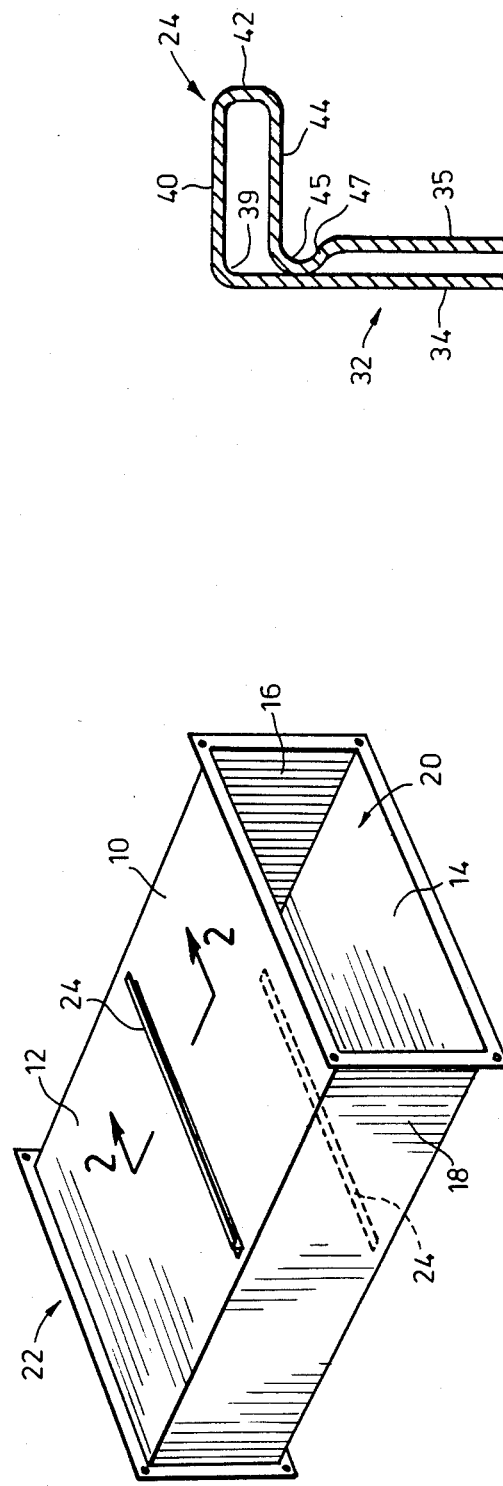
FIG. 1 is a perspective view of a section of ductwork, with the intermediate reinforcement or stiffener of the present invention applied thereto.

FIG. 1 shows a length of ductwork 10 constructed from sheet metal and having four substantially flat walls 12, 14, 16 and 18. The length 10 has two open ends 20 and 22, and between these ends are provided two elongated stiffeners 24 on the two widest walls 12 and 14. The upper stiffener is visible in solid lines, whereas the lower one is shown in broken lines.

The stiffener 24 is preferably made from formed sheet metal and comprises, in section, a base leg 27 defined by two juxtaposed layers 29 and 30 of sheet metal, and an upstanding leg 32 defined by two layers 34 and 35 of sheet metal. More particularly, the layer 29 of the base leg 27 and the layer 34 of the upstanding leg 32 are integral at a bend 37 and extend at right angles to each other. The layer 34 undergoes a right angle bend 39 at its top edge and is integral with an upper flat wall 40 which is integral at its rightward edge with a downwardly extending short wall 42, the latter being integral at its bottom with a leftwardly extending wall 44. The wall 44 undergoes a curved bend at 45 which is rightwardly offset at 47 to join the upper edge of the layer 35. The layer 35 undergoes an offset at the bottom edge, identified by the numeral 49, and then is juxtaposed at 51 against the bend 37 to become integral with the layer 30. At the left of the base leg 27, the layer 30 has a free edge 53, and the layer 29 defines a re-entrant folded edge 55 which provides a slot that encloses the free edge 53. The stiffener thus resembles an I-beam in strength and in section, having a web and two flanges, one at either end of the web.

Figure 2:
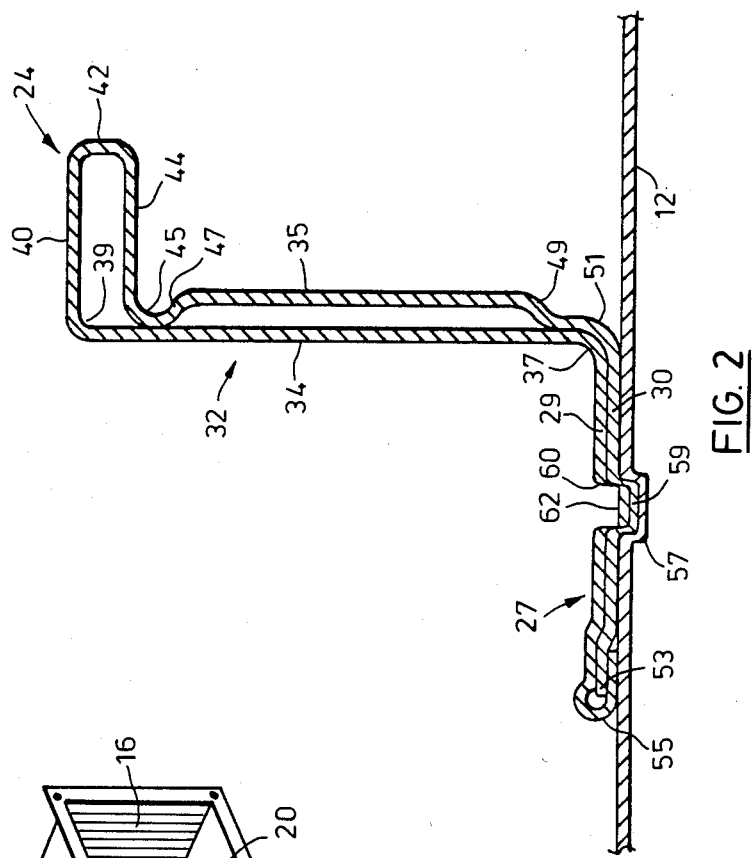
FIG. 2 is a vertical sectional view taken at the line 2—2 in FIG. 1.

It will thus be seen that all portions of the stiffener 24 are integral with each other. In the drawing of FIG. 2, the hatching of the cross-section changes direction at the wall 42, so that the mechanical connection shortly to be described can more easily be understood. However, the changing of the direction of the hatch lines does not mean that the item is not a single integral piece.

As particularly seen in FIG. 2, the stiffener 24 is juxtaposed with its base leg 27 against the flat wall 12 of the lenth 10 of ductwork, so that there are defined first, second and third layers of juxtaposed sheet metal. In FIG. 2, the layer 12 is considered the first layer, the layer 30 is considered the second layer, and the layer 29 is considered the third layer. As can be seen, the second layer is sandwiched between the first and third layers.

Figure 3:
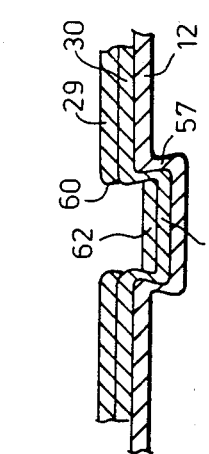
FIG. 3 is an enlargement of the mechanical connection provided by this invention.

The stiffener 24 is connected to the wall 12 by a plurality of mechanical connections distributed along the length of the stiffener 24, one of the connections being seen in section in FIG. 2, and in larger section in FIG. 3.

At each such connection, the first layer (wall 12) defines a first displaced pocket 57 projecting downwardly away from the second layer 30. The second layer likewise defines a second displaced pocket 59 nested within the first displaced pocket 57. Both pockets are expanded, and as a result the pocket bottoms are thinner than the layers from which they are displaced. This dramatically improves the strength of the connection. The third layer 29 has an aperture 60 which is in registry with both pockets 57 and 59, the aperture resulting from the punching out of a disc 62 which is nested within the second displaced pocket 59 thus tending to keep the two nested pockets in mechanical connection with each other by restraining inward deformation or shrinkage of the second pocket 59.

In a preferred embodiment, the aperture 60, the disc 62 and the pockets 57 and 59 are all substantially circular, having been formed by a cylindrical punch.

A method of forming the new joint is substantially the same as that conventionally known for the two-layer punched joint, as described in the paper, "A New Mechanical Joining Technique for Steel Compared with Spot Welding", referred to earlier. Attention is directed to FIG. 4, which shows a die 64 supporting a bracket 66 on which two anvil portions 68 are swivelled. The anvil portions 68 define between them a substantially cylindrical recess 70. The three layers of sheet metal are identified in FIG. 4 by the same numbers as used in FIG. 2, namely 12, 30 and 29. The punch is shown at 72, and a resilient stripper is shown at 74. At the left in FIG. 4, the condition is shown prior to punching. In the middle of FIG. 4, the punch 72 has descended part way, and has sheared the slug 62 of material from the top layer 29. The anvil portions 68 are being pushed outwardly by the downwardly deformed material of the three layers, and the stripper 74 is beginning to resiliently deform. At the right in FIG. 4, the punch 72 has descended to its maximum penetration, and the anvil portions 68 have moved out of the way to allow the complete joint to be formed.

We have noted a particular benefit of the three-ply concept set forth herein, as a result of testing that has been carried out. Specifically, the extra slug, seen at 62 in FIG. 3, which results from the use of the three layers rather than the conventional two layers produces a more forgiving mechanical joint or connection. We have been able to obtain good mechanical connections with only one die set for all metal thicknesses joined in the experimental work, covering the range from 26 gauge to 18 gauge. The prior art techniques and apparatuses for joining only two layers of metal require the use of at least 3 or 4 different dies, which have different offsets which determine the maximum lateral displacement of the pockets 57 and 59. The prior art considered these variations to be essential in order to achieve an effective joint.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A mechanical connection for connecting together a juxtaposed first and second layer of malleable sheet material, the connection comprising:

a third layer of malleable sheet material overlying the first and second layers, with the second layer sandwiched between the first and third layers, the first layer defining a first displaced pocket projecting away from the second layer, the first pocket having integral bottom and side walls, the second layer defining a second displaced pocket nested within said first displaced pocket, the second pocket having integral bottom and side walls, the third layer having an aperture in registry with both pckets, the aperture resulting from the punching out of a disc which is nested within the second displaced pocket.

2. The invention claimed in claim 1, in which the first, second and third layers are of sheet metal.

3. The invention claimed in claim 1, in which the pockets, the aperture and the disc are all substantially circular.

4. A length of duct constructed from sheet metal and having at least one substantially flat wall and an elongated stiffener on said flat wall intermediate the ends of the length of duct, the stiffener being made from formed sheet metal and comprising, in section:

(a) a base leg defined by two juxtaposed layers of sheet metal, and (b) an upstanding leg defined by at least one layer of sheet metal, (c) all said layers being integral with each other, the stiffener being juxtaposed with its base leg against said flat wall so that there are defined first, second and third layers of juxtaposed sheet metal, the second layer being sandwiched between the first and third layers, the stiffener being connected to the said flat wall by a plurality of mechanical connections, at each connection:

(d) the first layer defining a first displaced pocket projecting away from the second layer, the first pocket having integral bottom and side walls, (e) the second layer defining a second displaced pocket nested within said first displaced pocket, the second pocket having integral bottom and side walls, (f) the third layer having an aperture in registry with both pockets, the aperture resulting from the punching out of (g) a disc which is nested within the second displaced pocket.

5. The invention claimed in claim 4, in which the pockets, the aperture and the disc are all substantially circular.

6. The invention claimed in claim 4, in which the upstanding leg is defined by two-layers of sheet metal which are integrally joined along an edge region remote from the base leg.

7. The invention claimed in claim 6, in which one layer of the base leg has a free edge remote from the upstanding leg, and the other layer of the base leg defines a re-entrant foilded edge which encloses said free edge.

* * * * *